March 14, 1961 F. W. FELMET 2,974,967
TOOL HOLDING MEANS
Filed Jan. 23, 1959 3 Sheets-Sheet 1

INVENTOR.
Frederick W. Felmet
BY
Parker & Brochner,
Attorneys.

March 14, 1961     F. W. FELMET     2,974,967
TOOL HOLDING MEANS
Filed Jan. 23, 1959     3 Sheets-Sheet 2
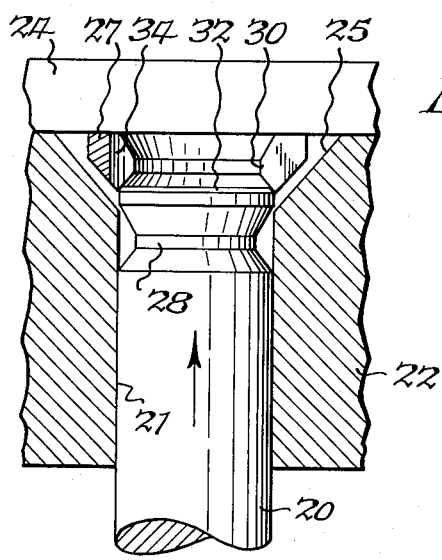
Fig. 5.
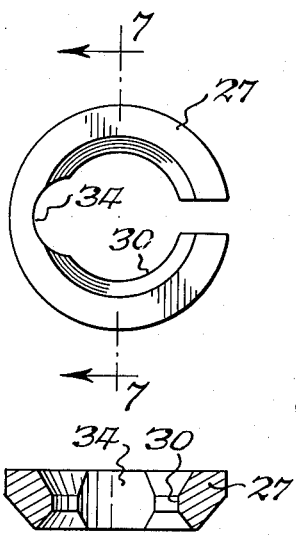
Fig. 6.
Fig. 7.
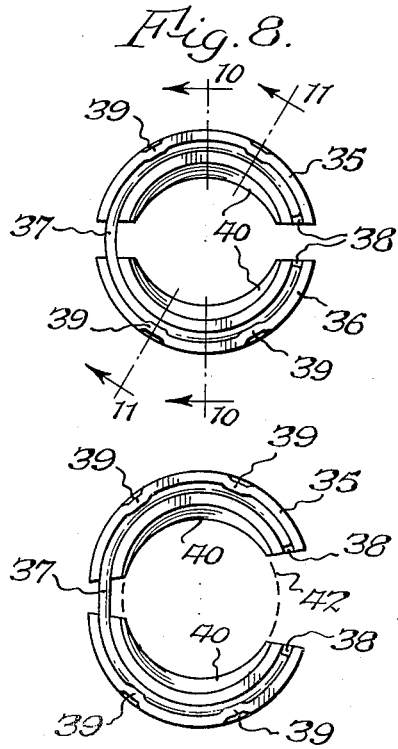
Fig. 8.
Fig. 9.
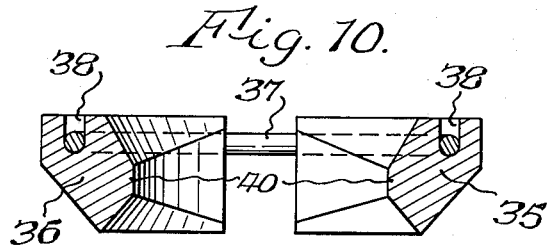
Fig. 10.
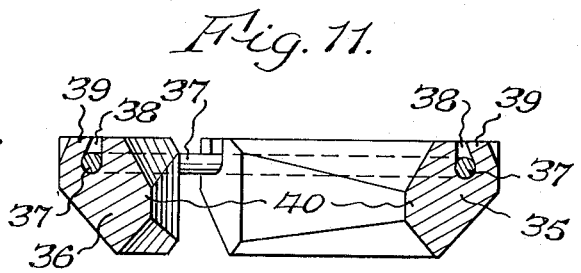
Fig. 11.
INVENTOR.
Frederick W. Felmet,
BY Parker & Prochnow,
Attorneys.

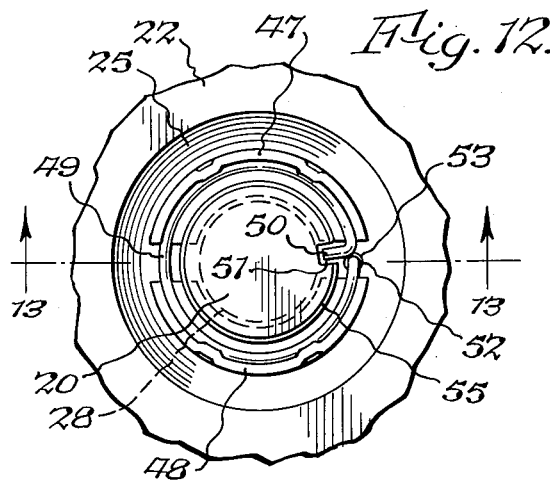
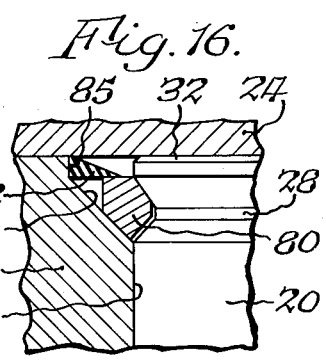
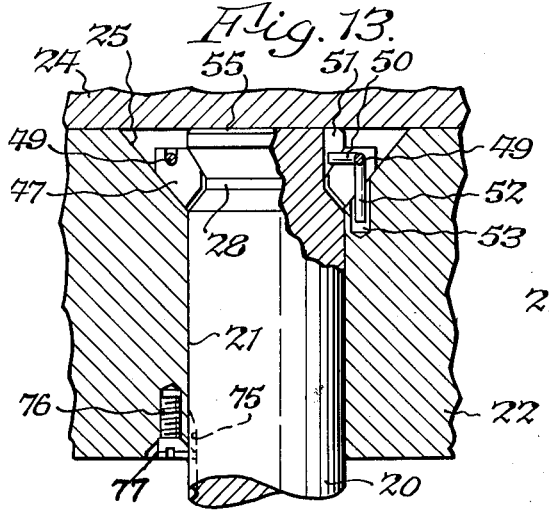
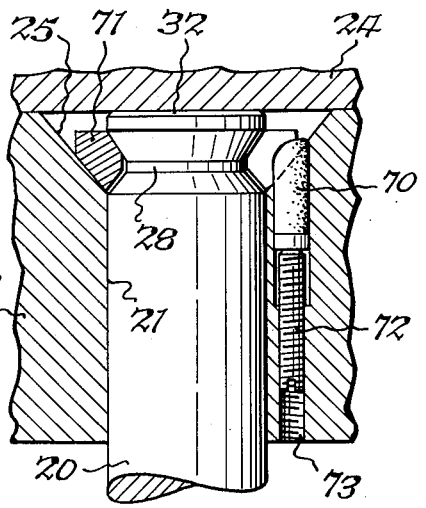
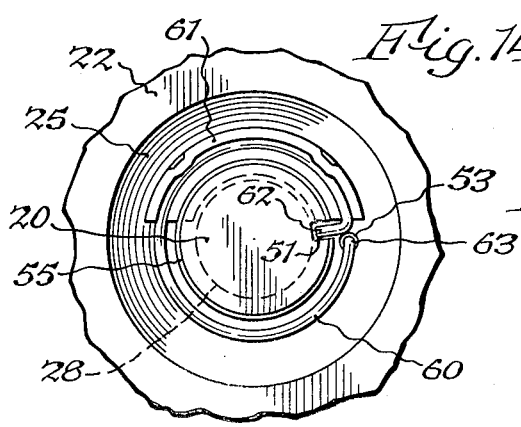
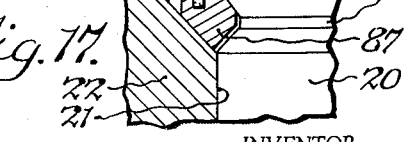

United States Patent Office 2,974,967
Patented Mar. 14, 1961

2,974,967
TOOL HOLDING MEANS

Frederick W. Felmet, 540 Delaware Ave., Tonawanda, N.Y., assignor of one-half to Robert H. King, Pendleton, N.Y.

Filed Jan. 23, 1959, Ser. No. 788,681

20 Claims. (Cl. 279—89)

This invention relates to means for holding a tool in a retainer or holder in such a manner that the tool can be readily removed therefrom.

My improvements have been herein described and shown for use in connection with the holding of punches in a punch retainer or holder, but it will be obvious that my invention may be applied to holders of tools other than punches.

In the mounting of punches in a press the stripping action when a punch is drawn out of the work which has been punched requires the punch to be very securely held to avoid having the punch pull out of its holder. Furthermore punches are some times arranged close to other punches so that there is very little space left between punches in which punch-releasing means can be arranged.

It is consequently an object of this invention to provide holding means for a tool which securely hold the tool in its holder but which releases the tool so that it can be removed from the holder by merely turning the tool while pulling it out of the holder. It is also an object to provide tool-locking and releasing means of this type which may be applied to a holder without providing any additional device mounted on the holder for releasing the tool.

A further object is to provide tool-holding means in which the tool can be easily inserted into a bore of a holder by merely pushing it into the bore and in which the locking means engage the tool to prevent removal thereof by pulling the tool out of the bore, but in which the locking means can be released by merely turning the tool about its axis while removing it from its holder.

A further object is to provide tool-holding means of this type in which the tool is provided adjacent to the end thereof remote from the work-penetrating end of the tool with an annular groove, and in which the holder of the tool has an annular recess in registration with the groove and in which a locking member is provided in the recess which has a part which moves into the groove to hold the tool against axial movement out of engagement with its holder, and in which the locking member may be moved out of the groove into the recess to free the tool so that it may be removed from its holder.

A further object is to provide a tool of this kind with a locking member which may be manually moved out of the groove in the tool into the recess in the holder to permit withdrawing the tool from its holder.

In the accompanying drawings:

Fig. 5 is a view similar to Figs. 1 and 2 showing the punch being moved into its locked position in the holder.

Fig. 6 is a face view of the locking member removed from the punch and retainer.

Fig. 7 is a transverse, sectional view thereof on line 7—7, Fig. 6.

Fig. 8 is a face view of a locking member of modified construction.

Fig. 9 is a face view of the same locking member showing it in punch-releasing position.

Figs. 10 and 11 are transverse sectional views on an enlarged scale respectively on lines 10—10 and 11—11, Fig. 8.

Figure 4:
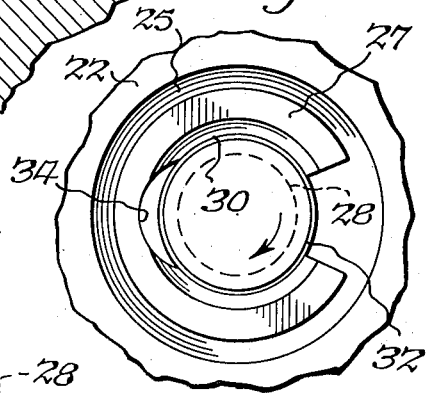
Fig. 4 is a similar view to Fig. 3, but showing the locking member in punch-releasing position.
Figure 3:
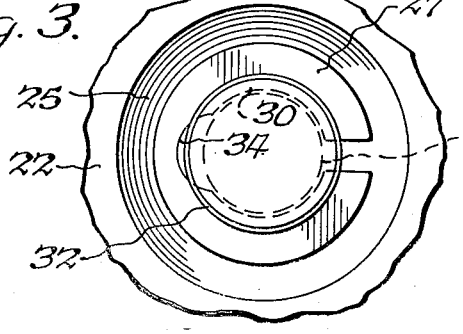
Fig. 3 is a plan view thereof on line 3—3, Fig. 1.

Fig. 12 is a view similar to Figs. 3 and 4 and showing a locking member of modified construction.

Fig. 13 is a sectional elevation thereof on line 13—13, Fig. 12.

Fig. 14 is a face view of a punch and a part of a holder, and of a locking member of another modified construction.

Fig. 15 is a sectional elevation showing a locking member of another modified construction which is movable manually into punch-releasing position.

Figs. 16 and 17 are fragmentary sectional elevations showing locking members provided with resilient means for urging the locking members into locking position.

In the particular embodiment shown in Figs. 1–7, 20 represents the shank of a tool which, in the construction illustrated, is a punch, and this shank is inserted through the usual bore 21 in a punch retainer or holder 22. 24 represents the usual hardened backing plate to which the punch retainer or holder may be secured and against which the upper end of the punch bears.

In accordance with my invention, I provide the punch retainer or holder 22 near the upper end of its bore 21 with an annular recess 25 which may be in the form of a countersink which is accurately concentric with the axis of the bore 21. Within this annular recess I provide a locking member 27 which is movable along the conical face of the countersink toward and from an annular groove 28 formed in the upper portion of the shank 20. The locking member 27 has a projection 30 which is formed to enter into and seat in the annular groove 28 of the shank when in the position shown in Fig. 1, in which position it holds the tool firmly against downward movement out of the bore 21. This locking member 27 however, when moved upwardly along the inclined face of the countersink will move its projection 30 out of the groove 28 in the shank, as shown in Fig. 2, so that the shank may be withdrawn downwardly out of the bore 21.

The lower face of the projection 30 of the locking member is bevelled and also the upper edge of the shank 20 of the tool preferably has a bevel 32 which is formed to engage with the lower bevelled face of the locking member when the tool is moved upwardly into its operative position, as shown in Fig. 5. This bevel of the tool shank cooperating with the bevel of the projection 30 of the locking member will consequently cause this locking member to move upwardly in the recess 25 and expand so that upon completion of the upward movement to the tool, the locking member will move by spring action into the groove of the tool shank into the position shown in Fig. 1, and thus lock the tool in the retainer or holder.

The locking ring may be of several different constructions to permit it to be expanded for moving out of the groove 28 in the tool shank and to again contract to move into the groove of the tool shank to hold the shank in place in the retainer. In its simplest form the locking member may be in the form of a split ring made of a tempered spring metal, or a resilient plastic material to give thrust inwardly.

Figure 1:
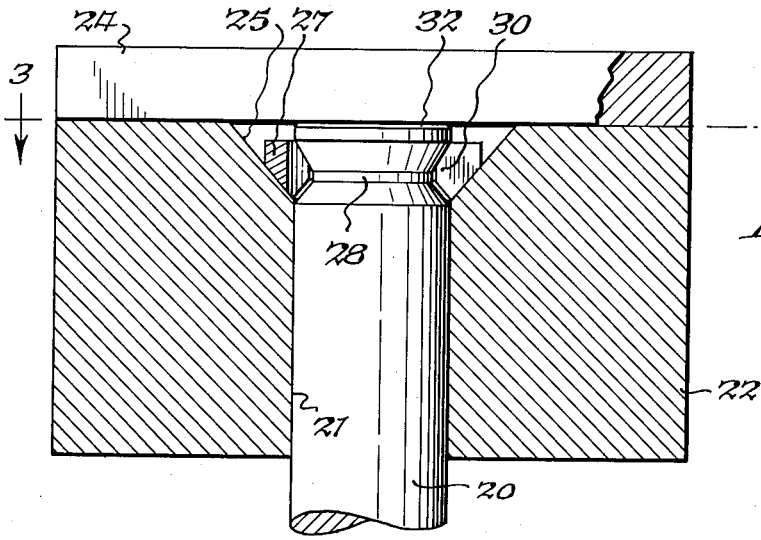
Fig. 1 is a sectional elevation of a punch-retainer or holder and a punch provided with locking means for holding the punch in the holder.
Figure 2:
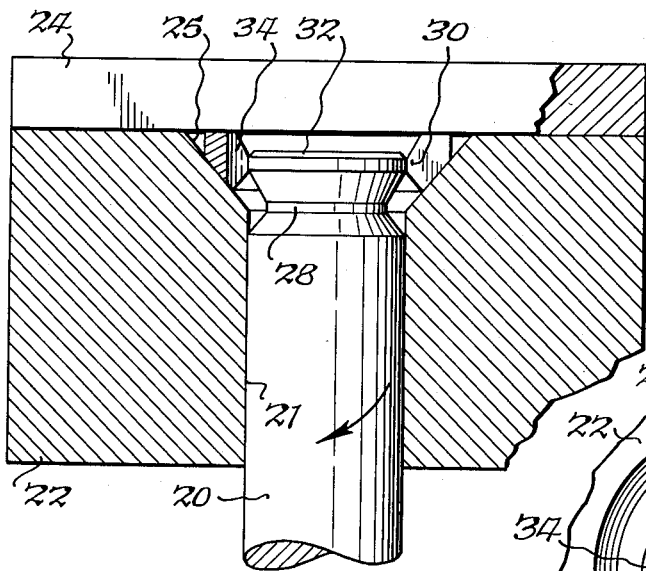
Fig. 2 is a similar view showing the locking means moved into position to release the punch.

Figs. 3 and 4 show respectively the locking member when in the groove of the shank of the tool, as shown in Fig. 1 and when moved outwardly in the recess or countersink of the retainer as shown in Fig. 2.

I have also found that the when a resilient split ring is employed as the holding member, the locking member may be moved from its holding position into its releasing position by merely turning the tool about its axis and exerting a slight pull on the same in a direction to remove the tool shank from the bore in the holder. This action is facilitated by providing the angle of the countersink or recess 25 and the angle at the upper part of the groove in the shank so that they converge downwardly. This tool-releasing action effected by the moving of the locking member entirely into the recess of the tool holder by turning the tool can be further facilitated by frictional contact between the upper face of the groove 28 and the upper face of the projection 30 of the locking member. This friction need only be slightly greater than that between the inclined face of the countersink 25 and the part of the locking member contacting therewith. This difference in friction, for example, can be easily accomplished by leaving the upper face of the groove 28 slightly rough after machining and providing a better finish between the countersink 25 and the part of the locking member engaging therewith. Any other means for slightly roughening the upper surface of the groove 28 on the face of the locking member engaging therewith, or both of these surfaces, may be employed.

As a result of this arrangement, the downward pull and a slight turning of the shank of the tool in either direction will result in an enlarging or opening of the split ring and moving of the same outwardly in the recess or countersink, and when the locked member reaches the position shown in Fig. 2, the tool can be removed from its bore 21 by downward pull.

The fact that the angle of the upper part of the groove in the tool with the axis of the tool is less than the angle of the countersink also helps in releasing the tool due to the fact that the smaller angle results in more driving force being exerted on the locking member of the tool than is produced by the locking member on the countersink. Consequently even if there is no difference in friction between the two faces of the locking member there would still be a tendency, upon pull and rotation of the tool, to rotate the locking member and moving it outwardly into the recess in the tool holder.

The locking member, as shown in Figs. 3 and 4, is provided on the inner edge thereof opposite to the split in the ring with a curved recess 34 which serves the twofold purpose of reducing the cross section of the locking member so as to facilitate the bending of the same into open positions, and also by extending this recess, the inner bore of the locking ring is enlarged, thus reducing the extent to which the locking ring must be opened to permit the shank of the tool to be withdrawn from its holder.

In Figs. 8-11 I have shown a locking member of the split ring type which is formed of separate parts or segments 35 and 36 and these parts are connected by a spring 37. This spring is preferably arranged in annular grooves 38 formed in the upper faces of the two parts of the locking ring, and the spring may be held in place on the two parts of the locking ring by staking portions of the grooves inwardly as shown at 39. Parts of this locking member have the faces thereof which engage the countersink similar to those described in connection with the ring 27 and have the inwardly projecting member 40 thereof of modified form so that the inner faces of the projections 40 are formed on greater radii than the radius of the groove in the shank, as clearly shown in Figs. 8 and 9, so that the two parts of the locking ring need not be separated to such a great extent to move the locking ring completely out of the groove in the tool shank. The broken lines 42 in Fig. 9 represent the circumference of the tool shank, and it will be seen from this figure that by making the inner portion of the projection 40 of greater diameter than the diameter of the tool shank, the shank will be released when the two parts of the locking ring are separated to a lesser extent than would otherwise be necessary. The operation of the tool-holding means shown in Figs. 8-11 is identical with that shown in Figs. 1-7.

It is possible to move the locking member outwardly into the recess or countersink to disengage the tool without depending on friction, and in Figs. 12-15 other means for accomplishing this result are disclosed. In Figs. 12 and 13 the locking ring, for example, also comprises two parts 47 and 48 connected by means of a spring wire 49 in approximately the same manner as in Figs. 8-11. However in Figs. 12 and 13 one end of the spring is provided with an inwardly bent extension or rib 50 which is formed to extend into an upright slot 51 in the upper end of the tool shank. The other end of the wire is provided with a downwardly extending bent part or rib 52 which extends into a hole 53 formed in the punch holder or retainer. In this case, if the shank of the tool is turned in a counterclockwise direction, as shown in Fig. 12, it will be obvious that the two halves 47 and 48 of the locking ring will be spread apart into positions approximately similar to those shown in Fig. 9, so as to release the shank of the tool. After the shank has been pulled downwardly out of engagement with the locking member, this member will again be contracted by its spring 49. When the tool is again moved upwardly in the bore of the retainer to place it in operative position, its bevelled upper end 55 will first spread the two parts of the locking member outwardly, and the tool must then be turned until the projection 50 of the spring enters the slot 51, whereupon the tool may be further moved upwardly into engagement with the backing plate, whereupon the spring 49 will draw the two locking ring parts 47 and 48 into the groove in the tool shank. I have also found that the locking device operates successfully if one of the ends of the wire 49 has a projection or rib, in which case friction is employed in turning the tool to release it, but in that case friction is supplemented by holding one end of the spring fixed to either the tool shank or the tool retainer.

Instead of having one or both ends of the spring wire to enter into holes in the tool shank or retainer or both, the wire ends may be merely bent over so that one end bears against the shank and the other end against the retainer, and the ends may be provided with some friction-producing material, such for example as rubber or a plastic.

In the modified construction shown in Fig. 14, I have employed a spring member or ring 60 similar to the ring 49 shown in Figs. 12 and 13, but one of the two segments 47 and 48 is omitted, only a single segment 61 being employed in this construction. It will be obvious that this segment need not extend about the shank to as great an extent as shown, since even a relatively short locking member may be employed to hold this shank of the tool in place in its holder. This ring has a projection 62 corresponding to the projection 50 shown in Figs. 12 and 13 and another projection 63 corresponding to the projection 52 in the other views. It is also possible in this construction to omit the spring 60 entirely since the locking member in that case will slide by gravity along the counterbore into engagement with the groove in the shank, and if there is a slight friction between the upper face of the bore of the shank and the part of the locking member engaging therewith, then if the tool is turned and pulled simultaneously, the locking member will be moved upwardly into the recess in the holder to release the tool.

In Fig. 15 I have shown a construction in which the locking member may be of a construction similar to that shown in Figs. 1-7, and in this case instead of depending on friction between the shank and the locking member, a small plunger 70 may be provided in a hole in the punch retainer, the plunger terminating in the counterbore or recess in the holder. The split locking ring 71 may consequently be moved upwardly into the recess in the holder and out of the groove in the tool shank by pushing the plunger 70 upwardly. This may be done manually or by means of a screw 72 arranged in a threaded hole 73 extending upwardly in the punch retainer or holder into engagement with the plunger 70.

It will be noted in connection with Figs. 8–14 that the locking ring is released only by turning the tool while pulling the same in one direction so as to separate the ends of the spring member and thus move the parts of the locking ring out of the groove in the holder. Rotation of the tool in the other direction will have no effect upon the locking mechanism. Consequently my improved holding means may be employed in connection with a rotary tool which rotates only in the direction which does not unlock the tool. The tool can then be removed by pulling and turning it manually in the reverse direction.

If it is desired to use the tool-locking means herein described in connection with a non-circular punch which must be held against rotation about its axis, any suitable means may be employed for releasably holding the shank of the punch in the desired position. For example, I have shown in Fig. 13 a groove or keyway 75 provided in the side of the shank of the punch and a screw 76 having a threaded engagement in a threaded hole in the punch holder or retainer and having a head of sufficient size to enter into the groove or keyway 75 and thus hold the punch against turning. When it is desired to remove the tool from its holder or retainer, the screw 76 must first be removed to permit the punch to be turned sufficiently to release it from the locking member, or if desired, the head of the screw may have a portion thereof removed as indicated at 77, so that when this portion faces the shank of the punch, the punch can be turned and removed.

In order to accurately locate the punch in its correct position, the keyway, the screw and the threaded hole in the punch holder are formed so that when the screw is turned to lock the punch against turning, the head of the screw presses against the punch at the keyway, thus forcing the screw head against the countersink of the threaded hole in the retainer. This not only holds the punch securely in correct position but also binds the screw in place against turning. In this connection, it may also be desirable to make the screw head of slightly greater diameter than the diameter of the transverse curvature of the keyway, so that the head of the screw bears against the edges of the keyway.

It may, at times, be desirable to apply some yielding force to the locking ring to move it into its locking position. For example, in the construction shown in Fig. 16, 80 represents the locking ring, and I have provided in the upper portion of the countersink or recess a resilient ring or partial ring 82. This ring bears against a vertical shoulder of the recess, and is positioned so that when the locking member 80 is moved upwardly the resilient ring 82 will be deformed or moved upwardly out of the position shown in Fig. 16 in which position it will exert downward pressure against the locking ring and urge it into its locking position.

In Fig. 17 I have shown another construction for accomplishing the same result. In this view a locking ring 87 is provided at intervals along the same with upwardly extending resilient pieces 88, which may for example be pieces of rubber extending into holes in the locking member 87. These holes are preferably countersunk at their upper ends as shown at 89. Consequently when the locking ring is forced into its upper position the pieces 88 are compressed and forced into the countersinks 89. When, however, a punch or other tool is inserted into the holder 22, the resilient pieces 88 will tend to straighten themselves and thus apply yielding pressure to the locking ring 87 to urge it into its operative position.

My invention, in addition to the advantages specified, has the further advantage that the locking devices shown have extended bearing or contact surfaces with both the tool shank and the tool holder or retainer, so that when my invention is used in connection with punches, the punch holder or retainer can be made of a softer metal than usually employed, thus saving in the cost, for example, by omitting the heat treating of the retainer plate. Also the locking device itself can be made of softer materials than those customarily used for holding a punch in its holder.

The various parts comprising my improved tool-holder are of relatively simple construction and involve no machining difficulties so that it can be produced at moderate cost.

It will be understood that various changes in the details, materials and arrangements of parts which have been herein described and illustrated in order to explain the nature of the invention may be made by those skilled in the art within the principle and scope of the invention as expressed in the appended claims.

I claim:

1. Tool-holding means for releasably retaining the shank of a tool in a bore of a tool-holding member, including an annular groove in said shank adjacent to the outer end thereof opposite to the work-penetrating end of the tool, an annular recess in said holding member and arranged about said groove in said shank when said tool is in operative relation to said holding member, and a locking member arranged in said recess and having a part extending into said groove in said tool shank for holding said shank against movement out of said bore in said holding member, and means operable at will by turning said tool and subjecting it to a pull in a direction away from said locking member for moving said locking member out of said groove in said shank and into said recess to permit said tool to be moved out of said bore.

2. Tool-holding means according to claim 1 in which said means for moving said locking member out of said groove are cooperating friction surfaces on said shank and said locking member which urge said locking member from said groove into said recess when said shank is simultaneously turned and pulled.

3. Tool-holding means according to claim 1 in which said recess in said holding member is a countersink near the upper portion of said bore along which said locking member is slid outwardly to withdraw said locking member from said groove to release said tool.

4. Tool-holding means according to claim 1 in which said recess in said holding member is a countersink near the upper portion of said bore along which said locking member is slid outwardly to withdraw said locking member from said groove to release said tool, and in which said means for moving said locking member out of said groove are cooperating driving surfaces on said shank and said locking member which urge said locking member from said groove into said recess when said shank is simultaneously turned and pulled.

5. Tool-holding means according to claim 1 in which said locking member is an expandable split ring in said recess and having a part extending into said groove and expandable to move said part out of said groove and into said recess to release said tool.

6. Tool-holding means according to claim 1 in which said locking member is in the form of a segment of a ring and a spring biased to urge said segment toward said shank, said segment having a part formed to extend into said groove and urged into said groove by said spring.

7. Tool-holding means according to claim 1 in which said locking member is in the form of a segment of a ring and a spring biased to urge said segment toward said shank, said segment having a part formed to extend into said groove and urged into said groove by said spring, said segment having a part in frictional engagement with a wall of said groove, whereby simultaneous rotating and pulling of said tool moves said segment out of said groove into said recess to release said tool.

8. Tool-holding means for releasably retaining the shank of a tool in a bore of a tool holding member, including an annular groove in said shank adjacent to the outer end thereof opposite to the work-penetrating end of the tool, a countersink in said tool-holding member forming a recess extending about said groove, said groove having a frusto conical face adjacent to said outer end of said tool which diverges outwardly from said countersink, and a locking member in said recess having a part formed to extend into said groove and having a face of similar curvature as said frusto conical face of said tool, and another face engaging said countersink, whereby a force on said tool urging said first mentioned face of said locking member against said annular face of said groove exerts a force on said locking member urging it out of said groove and into said recess when said tool is also turned and pulled simultaneously.

9. Tool-holding means according to claim 8 in which said frusto conical face of said groove and the cooperating face of said locking member have a greater coefficient of friction than said countersink and the face of the locking member cooperating therewith, to cause said locking member to move out of said groove when the tool is turned while pulled in a direction to move said tool out of said bore.

10. Tool-holding means according to claim 8 in which one end of said locking member is held against rotation.

11. Tool-holding means according to claim 8 in which one end of said locking member is held against movement relatively to said tool.

12. Tool-holding means according to claim 8 in which said locking device comprises a segment arranged within said countersink and including a spring member secured to said segment and extending partly about said tool, one end of said spring member being bent over and extending into a hole formed in said holder, said spring member urging said segment into said groove and permitting said segment to move out of said groove when said tool is turned and urged out of said bore.

13. Tool-holding means for releasably retaining the shank of a tool in a bore of a tool-holding member, including an annular groove in said shank adjacent to the outer end thereof opposite to the work-penetrating end of the tool, an annular recess in said holding member and arranged about said groove in said shank when said tool is in operative relation to said holding member, a split ring locking member arranged in said recess and having a part extending into said groove, and a plunger guided for movement in said holding member and movable upwardly into the split of said locking member for spreading said locking member to move the same out of said groove to release the tool.

14. Tool-holding means for releasably retaining the shank of a tool in a bore of a tool-holding member, including an annular groove in said shank adjacent to the outer end thereof opposite to the work-penetrating end of the tool, an annular recess in said holding member and arranged about said groove in said shank when said tool is in operative relation to said holding member, and a locking member arranged in said recess and having a part extending into said groove in said tool shank for holding said shank against movement out of said bore in said holding member, and means for holding said locking member against rotation, said locking member being expanded by turning said tool to move said locking member out of said groove to release the tool.

15. Tool-holding means for releasably retaining the shank of a tool in a bore of a tool-holding member, including an annular groove in said shank adjacent to the outer end thereof opposite to the work-penetrating end of the tool, a countersink in said tool-holding member forming a recess extending about said groove, said groove having a frusto-conical face adjacent to said outer end of said tool which forms a smaller angle with the axis of said tool than the angle which said countersink forms with said axis, and a locking member in said recess having a part formed to extend into said groove and having a face of similar curvature as said frusto-conical face of said tool, and another face engaging said countersink, whereby said face of said tool exerts greater driving force on said locking member than on said countersink when said tool is turned and pulled, to turn said locking member with said tool and move it into said recess.

16. Tool-holding means for releasably retaining the shank of a tool in a bore of a tool-holding member, including an annular groove in said shank adjacent to the outer end thereof opposite to the work-penetrating end of the tool, an annular recess in said holding member and arranged about said groove in said shank when said tool is in operative relation to said holding member, and a locking member arranged in said recess and having a part extending into said groove in said tool shank for holding said shank against movement out of said bore in said holding member, means operable at will for moving said locking member out of said groove in said shank and into said recess to permit said tool to be moved out of said bore, and yielding means urging said locking ring downwardly into said groove when said means for moving said locking member into said groove are not actuated.

17. Tool-holding means for releasably retaining the shank of a tool in a bore of a tool-holding member, including an annular groove in said shank adjacent to the outer end thereof opposite to the work-penetrating end of the tool, a countersink in said tool-holding member forming a recess extending about said groove, said groove having a frusto conical face adjacent to said outer end of said tool which diverges outwardly from said countersink, a locking member in said recess having a part formed to extend into said groove and having a face of similar contour as said frusto conical face of said tool, and another face engaging said countersink, whereby a force on said tool urging said first mentioned face of said locking member against said annular face of said groove exerts a force on said locking member urging it out of said groove and into said recess when said tool is also turned and pulled simultaneously, and a yielding member in said countersink and acting on said locking ring to urge said part of said locking ring into said groove.

18. Tool-holding means according to claim 1 and including means on said tool-holding member for releasably holding said tool against turning.

19. Tool-holding means according to claim 1 in which said tool shank has a keyway, and a screw in said tool-holding member having a head which enters said keyway and which holds said tool against turning.

20. Tool-holding means according to claim 1 in which said tool shank has a keyway, and a screw in said tool-holding member having a head which enters said keyway and which holds said tool against turning, said screw having a portion of its head recessed to enable said screw to be turned into a position in which said head is out of said keyway.

References Cited in the file of this patent

UNITED STATES PATENTS

| 1,783,028 | Sheridan | Nov. 25, 1930 |
| 1,824,509 | Snader | Sept. 22, 1931 |
| 2,245,676 | Johnson | June 17, 1941 |
| 2,381,943 | Williams | Aug. 14, 1945 |
| 2,705,119 | Ingwer | Mar. 29, 1955 |
| 2,808,108 | Pellegrino | Oct. 1, 1957 |
| 2,821,401 | Eben | Jan. 28, 1958 |
| 2,915,926 | Woerner | Dec. 8, 1959 |

FOREIGN PATENTS

| 548,215 | Great Britain | Sept. 30, 1942 |